United States Patent
Nakamitsu et al.

(10) Patent No.: US 6,980,930 B2
(45) Date of Patent: Dec. 27, 2005

(54) COMMUNICATION TERMINAL AND INFORMATION PROCESSING APPARATUS OF A PAYMENT SYSTEM

(75) Inventors: Hiroaki Nakamitsu, Fujisawa (JP); Hayashi Ito, Matsudo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 187 days.

(21) Appl. No.: 10/638,715

(22) Filed: Aug. 11, 2003

(65) Prior Publication Data

US 2004/0102930 A1    May 27, 2004

(30) Foreign Application Priority Data

Aug. 9, 2002 (JP) .............................. 2002-232404
Jul. 9, 2003 (JP) .............................. 2003-272184

(51) Int. Cl.[7] .......................................... G06F 17/60
(52) U.S. Cl. ...................................... 702/188; 705/52
(58) Field of Search ............................... 702/182, 188; 705/17, 261, 391, 40

(56) References Cited

U.S. PATENT DOCUMENTS 6,044,362 A * 3/2000 Neely ........................... 705/34
2001/0044779 A1 * 11/2001 Iima et al. ..................... 705/52
2002/0032616 A1 * 3/2002 Suzuki et al. .................. 705/26
2002/0046184 A1 * 4/2002 Villaret et al. ................. 705/64
2002/0052842 A1 * 5/2002 Schuba et al. ................. 705/40
2002/0062249 A1 * 5/2002 Iannacci ....................... 705/14
2002/0080931 A1 * 6/2002 Yamamoto et al. ........ 379/90.01
2004/0128255 A1 * 7/2004 Jung ............................. 705/65
2005/0060196 A1 * 3/2005 Tsushi et al. ................... 705/2

FOREIGN PATENT DOCUMENTS

JP           2003085401 A  *  3/2003  ........... G06F 17/60

* cited by examiner

*Primary Examiner*—Carol S. W. Tsai
(74) *Attorney, Agent, or Firm*—Pitney Hardin LLP

(57) ABSTRACT

A payment system automatically provides objective information and sets remuneration for objective information to high-rate. A payment system comprises multiple communication terminals and multiple information processing apparatuses. The information processing apparatus transmits remuneration expectation information indicating remuneration for transmission of objective information to a communication terminal. The communication terminal references remuneration expectation information, determines transmission destination of objective information according to a predetermined standard, and transmits objective information to the transmission destination, so that remuneration information is received.

8 Claims, 19 Drawing Sheets

Fig. 9

| Area | Category | Remuneration Expectation Value |
|---|---|---|
| ⋮ | | |
| Latitude32° N-32.2° N Longitude130° E-130.2° E | Temperature | 1 0 |
| Latitude33.6° N-33.7° N Longitude130.5° E-130.6° E | Humidity | 2 0 |

901 — Area
902 — Category
903 — Remuneration Expectation Value

Fig 1 0

|   | 1001 | 1002 |
|---|---|---|
|   | Category | Condition |
|   | ⋮ | ⋮ |
|   | Temperature | 9 points |
|   | Humidity | 25 points |
|   | ⋮ | ⋮ |

Fig. 16

| Transmission Destination Candidate Identification Information | Determination |
|---|---|
| Information Processing Apparatus A | Not Transmit |
| Information Processing Apparatus B | Transmit |

COMMUNICATION TERMINAL AND INFORMATION PROCESSING APPARATUS OF A PAYMENT SYSTEM

BACKGROUND OF THE INVENTION

1. Field of the Invention

The present invention relates to a payment system giving remuneration in return for provided information from an information processing apparatus to a communication terminal as an information provider.

2. Description of the Related Art

In the prior art, a payment system, for example, official bulletin on Japan Patent Laid Open No. 2002-63286 is well-known. This payment system comprises user's terminal wherein user inputs and outputs information, information storage distribution apparatus storing various control information and executing searches, updating, adding, and deleting information based on instructions of a distributor, data processing apparatus permanently storing various data to files and databases etc., and value returning apparatus having means for returning remuneration information to the information provider.

SUMMARY OF THE INVENTION

In a conventional payment system, the information provider needs to input and output information manually. Additionally, because returned remuneration information is determined after information is provided, remuneration information to be acquired is not clear at the point of transmission of information and there is no objective evaluation scale for acquired remuneration, so that the information provider cannot predict remuneration, thereby making it difficult to promote the providing of information.

The present invention solves the above-mentioned deficiency of a conventional payment system and it is an object of the present invention to provide information from the communication terminal without the user's knowledge and to automatically acquire remuneration information. It is a further object of the present invention to provide a payment system wherein remuneration expectation information related to remuneration for providing of information is transmitted from the information processing apparatus to the communication terminal, and the communication terminal determines whether information is to be transmitted based on remuneration expectation information.

In order to solve the above-described deficiency, the communication terminal of the present invention comprises objective information acquisition means acquiring objective information, objective information transmission means transmitting objective information, remuneration information reception means receiving remuneration information relating to remuneration information for the transmitted objective information.

Thereby, the communication terminal automatically measures and transmits objective information, so that it becomes possible for users to acquire remuneration information without inconvenient operations while enjoying various services.

In a still further aspect of the present invention, the information processing apparatus may transmit remuneration expectation information. In this case, the communication terminal may receive remuneration expectation information from multiple information processing apparatuses and may determine the transmission destination to which objective information is to be transmitted based on received remuneration expectation information.

Thereby, competition for acquiring objective information among information apparatuses arises, so that users of the communication terminal become able to acquire more remuneration.

BRIEF DESCRIPTION OF THE DRAWINGS

FIG. 9 is a diagram of an example of remuneration expectation information, FIG. 10 is a diagram of an example of the transmission destination determination standard, FIG. 12 is a functional block diagram of the information processing apparatus of the sixth embodiment of the present invention, FIG. 16 is a diagram illustrating an example of the determination result of the transmission destination of objective information, FIG. 17 is a flow chart demonstrating the process of the information processing apparatus of the third embodiment of the present invention, FIG. 18 is a functional block diagram of the communication terminal of the fourth embodiment of the present invention.

DETAILED DESCRIPTION OF THE PREFERRED EMBODIMENTS

Hereinafter, the embodiments of the present invention will be described with the use of drawings. The invention may be embodied in other specific forms without departing from the essential characteristics thereof.

Figure 1:
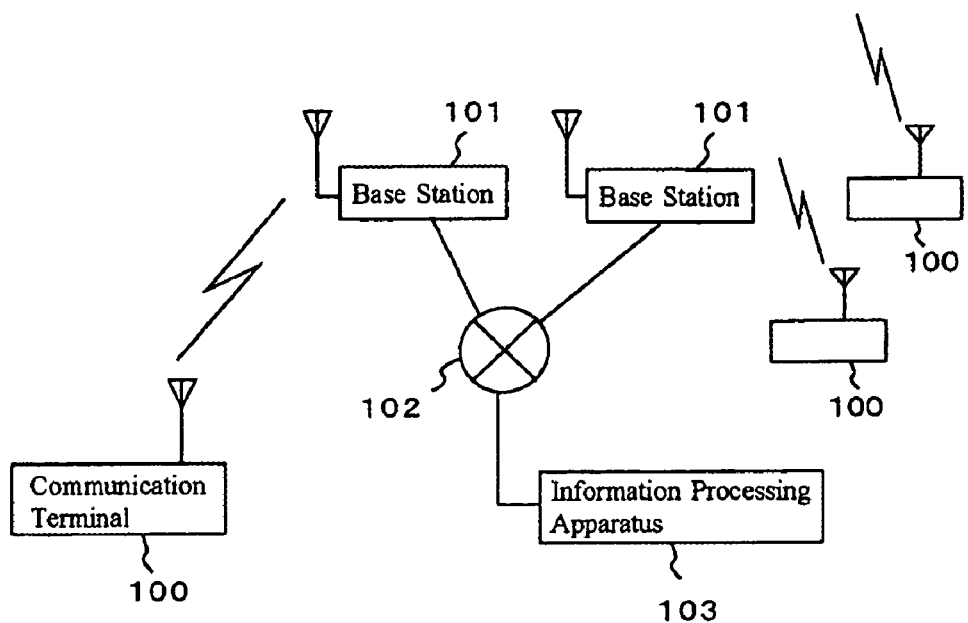
FIG. 1 is a schematic diagram of the first embodiment of the present invention.

FIG. 1 is a schematic diagram of the first embodiment of the present invention. In FIG. 1, the payment system of the present embodiment comprises multiple communication terminals 100, information processing apparatus 103 as center server, base station 101 which is able to communicate with information processing apparatus 103 through the network 102.

Information provided from communication terminal 100 is received by base station 101 and is transmitted to information processing apparatus 103 through the networks 102. Moreover, information processing apparatus 103 transmits remuneration information for received information to the communication terminal as the information provider through the network 102 and base station 101.

Note that the information provided from communication terminal 100, called "objective information", corresponds to information independent of subjectivity of the user of communication terminal 100. Examples of objective information include, but are not limited to, temperature, humidity, barometric pressure, rainfall level, ultraviolet rays level, pollen level, dust level, noxious fume level, noise level, required time to transfer from one specific point to another, number of passengers in a train compartment, and pictures taken etc. around communication terminal 100. Examples of pictures taken include, but are not limited to, photographic images of an accident and a disaster and photographic images of celebrities.

Figure 2:
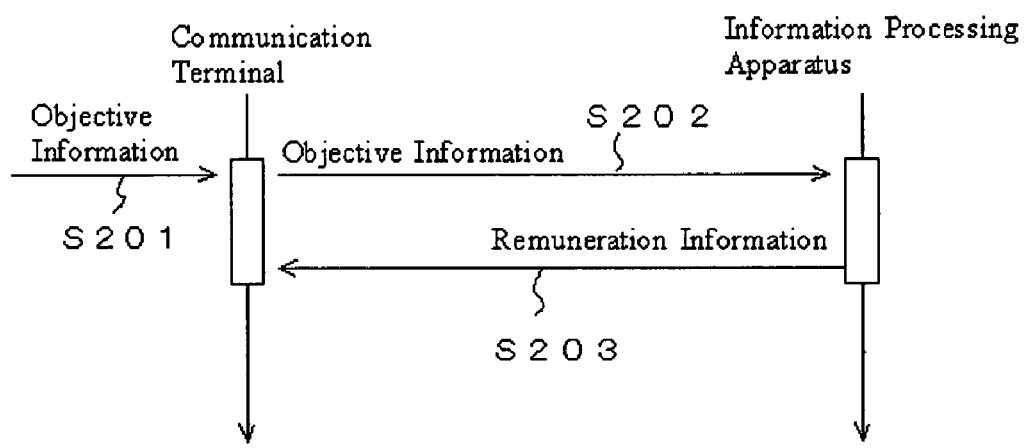
FIG. 2 is a sequential diagram of transmission and reception between the communication terminal of the first embodiment of the present invention and the information processing apparatus.

FIG. 2 is a sequential diagram of the process of transmission and reception between the communication terminal and the information processing apparatus.

In step S201, the communication terminal acquires objective information. Acquisition of objective information is executed at every passage of a predetermined time, at the point of detection of a predetermined distance of transfer from the position at which the last objective information was acquired, and by operations of the communication terminal such as, for example, opening the body and removing covers of various sensors etc.

In step S202, objective information is transmitted from the communication terminal to the information processing apparatus. Objective information may be transmitted immediately after the acquisition of objective information, or some time after objective information is temporarily stored in memory etc. Thereby it becomes possible to reduce communication costs by simultaneously transmitting objective information.

In step S203, the information processing apparatus transmits remuneration information related to remuneration for objective information transmitted from the communication terminal. Remuneration corresponds to, for example, but not limited to, electronic money and discount points for shopping. Moreover, remuneration information corresponds to programs operated by downloading to the communication terminal. For example, programs that make hardware attached to the communication terminal usable, thereby increasing the number of functions of the communication terminal. Furthermore, data, for example passwords etc., removing restrictions of communication terminals and other servers may be considered remuneration information.

Figure 3:
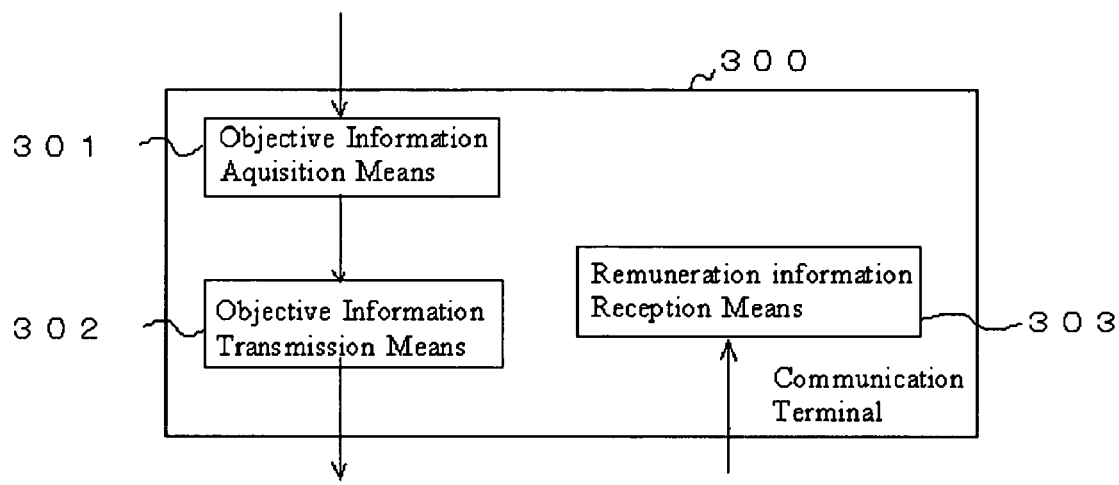
FIG. 3 is a functional block diagram of the communication terminal of the first embodiment of the present invention.

FIG. 3 is a functional block diagram of the communication terminal related to the present embodiment. Communication terminal 300 comprises objective information acquisition means 301, objective information transmission means 302, and objective information reception means 303.

Objective information acquisition means 301 acquires objective information indicating information which is deemed to be objective by various sensors, for example, but not limited to, the temperature sensor, humidity sensor, rainfall sensor, pollen level sensor, dust level sensor, noxious fume sensor, noise level sensor, CCD camera, and sensor set in a movable body.

Objective information transmission means 302 transmits the above-described objective information. Above-described objective information corresponds to objective information acquired in objective information acquisition means 301. Moreover, when objective information is transmitted, it may be transmitted in relation to information attribute information indicating where objective information was acquired and what kind of objective information it is etc. Furthermore, it may be transmitted in relation to identification information identifying the communication terminal acquiring objective information.

Figure 4:
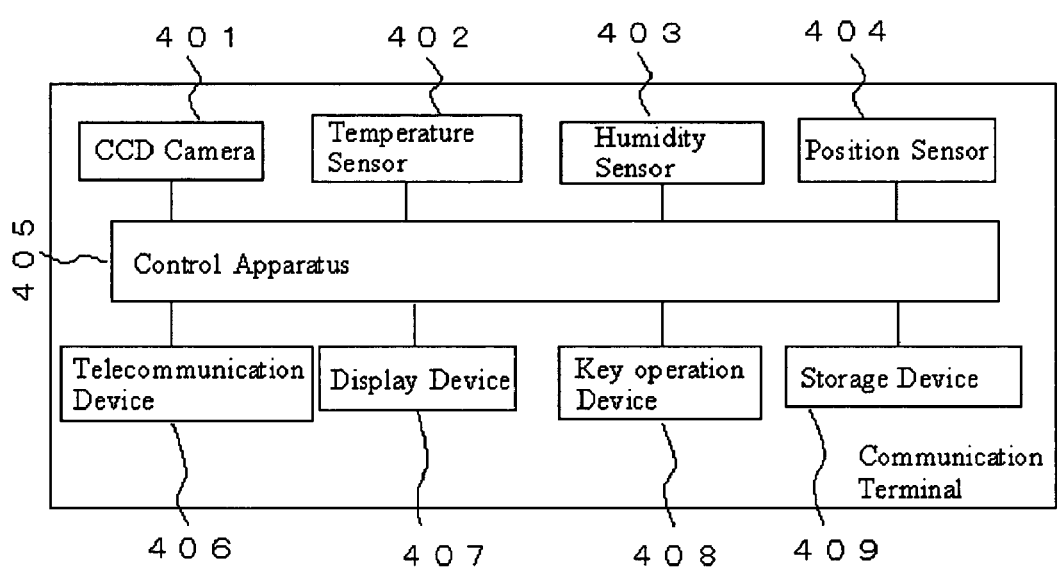
FIG. 4 is a diagram of an example of hardware configuration of the communication terminal of the present invention.

Objective information reception means 303 receives remuneration information. Remuneration information corresponds to information related to remuneration for the above-described objective information that is transmitted. Here, above-described objective information which is transmitted corresponds to objective information transmitted by objective information transmission means 302. FIG. 4 illustrates an example of the hardware configuration of the communication terminal. Sensors for acquiring objective information such as CCD camera 401, temperature sensor 402, humidity sensor 403 etc., and position sensor 404 such as GPS (Global Positioning System) are connected to control apparatus 405. Moreover, telecommunication apparatus 406, display device 407, key operation device 408, and storage device 409 are connected to control apparatus 405.

In control apparatus 405, for example, a program operates and acquires objective information by reading a value indicated in CCD camera 401, temperature sensor 402, and humidity sensor 403. Moreover, it acquires position information indicating current position by position sensor 404, and transmits objective information in relation to position information through position telecommunication device 406. Moreover, remuneration information is received through telecommunication device 406 and stored in storage device 409. Additionally, the position sensor may acquire position information by GPS as described above and also by detecting the base station of a wireless communication. Furthermore, in cases where the communication terminal is set in a movable body, position information may be acquired from the movable body. In cases where the communication terminal is detected to be connected by cable to a home personal computer, position information indicating position of home may be acquired.

Key operation device 408 detects the key operation for operating communication terminal 400, and the display device displays the result of the key operation and acquired remuneration information.

Storage device 409 stores information. For example, objective information is temporarily stored. Moreover, information identifying the communication terminal is stored. This information identifying the communication terminal may be transmitted with objective information. Thereby the information processing apparatus is able to determined which communication terminal transmits objective information, so as to set remuneration information to a high rate according to the transmission frequency of objective information. In addition, the storage device stores received remuneration information for managing it.

Figure 5:
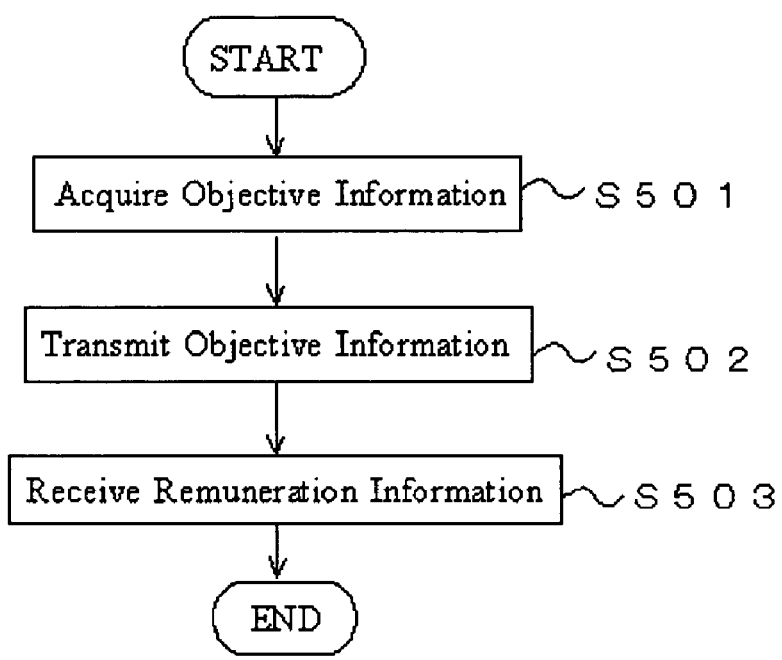
FIG. 5 is a flow chart of the process of the communication terminal of the first embodiment of the present invention.

FIG. 5 is a flow chart of the process of the communication terminal related to the present embodiment.

In step S501, objective information is acquired by objective information acquisition means 301.

In step S502, objective information is acquired by objective information acquisition means 302.

In step S503, objective information is acquired by objective information acquisition means 303.

In cases where a predetermined time passes or change of position is detected, the communication terminal executes the process illustrated in FIG. 5.

According to the present embodiment, the communication terminal automatically measures objective information and transmits it, and receives remuneration information for objective information, thereby making it possible to provide various services to users of communication terminals and to collect objective information extensively.

Figure 6:
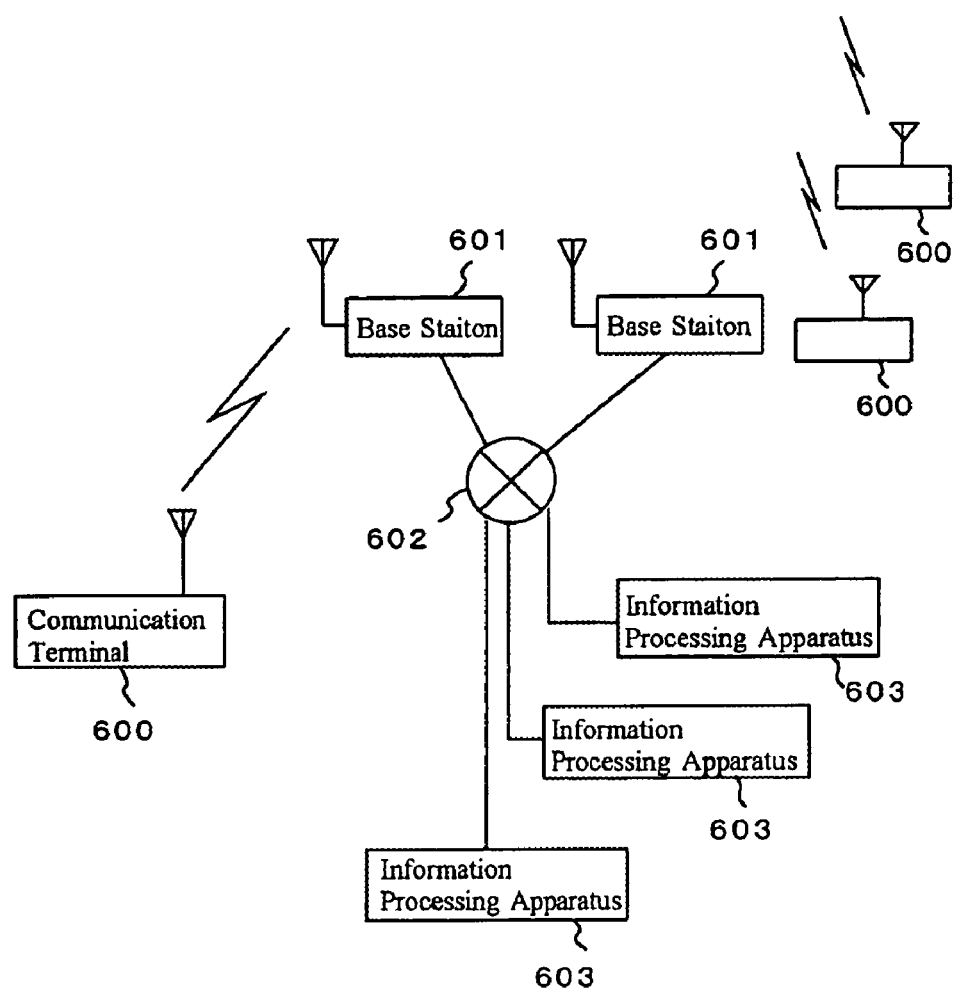
FIG. 6 is a schematic diagram of the second embodiment of the present invention.

FIG. 6 is a schematic diagram of the second embodiment of the present invention. In FIG. 6, the payment system of the present embodiment comprises multiple communication terminals 600, multiple information processing apparatuses 603, and base station 601 which can communicate with information processing apparatuses 603 through the network 602. Moreover, each information processing apparatus 603 is managed by different administrators such as information service companies. Each information processing apparatus 603 transmits information about remuneration information provided for transmission of objective information to communication terminal 600.

For example, in cases where communication terminal 600 is set in a car and pictures as objective information are automatically acquired by CCD camera etc., each information processing apparatus 603 transmits information indicating how much remuneration is given for pictures taken at the place and time of an accident or disaster. Communication terminal 600 transmits pictures to the information processing apparatus, for example, presenting the highest remuneration by comparing information about remuneration information received from each information processing apparatus 603 in cases where it takes pictures at the place of an accident and disaster.

Thereby competition among administrators of the information processing apparatus arises, so that a more profitable remuneration structure for the communication terminal user is constructed.

Figure 7:
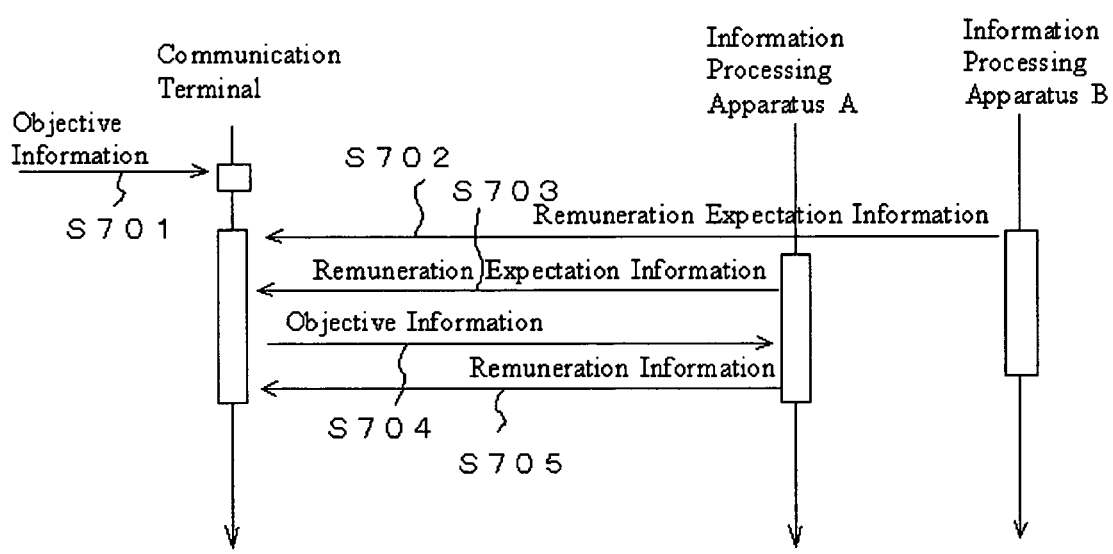
FIG. 7 is a sequential diagram of transmission and reception between the communication terminal of the second embodiment of the present invention and the information processing apparatus.

FIG. 7 is a sequential diagram of transmission and reception between communication terminal and the information processing apparatus.

In step S701, the communication terminal acquires objective information. For example, it acquires pictures from a camera at regular intervals.

In both steps S702 and S703, each information processing apparatus A and information processing apparatus B transmits remuneration expectation information. Here, remuneration expectation information corresponds to content of remuneration in return for transmission of objective information.

When the communication terminal acquires remuneration expectation information from multiple information processing apparatuses, it is determined whether objective information, for which remuneration in remuneration expectation information is given, is stored. When it is determined that objective information, which is a target of remuneration, is stored, it compares remuneration expectation information and determines the transmission destination that is the transmission destination of objective information.

In cases where determined transmission destination is information processing apparatus A, objective information is transmitted to information processing apparatus A in step S704.

In step S705, information processing apparatus A transmits remuneration information for transmitted objective information.

Figure 8:
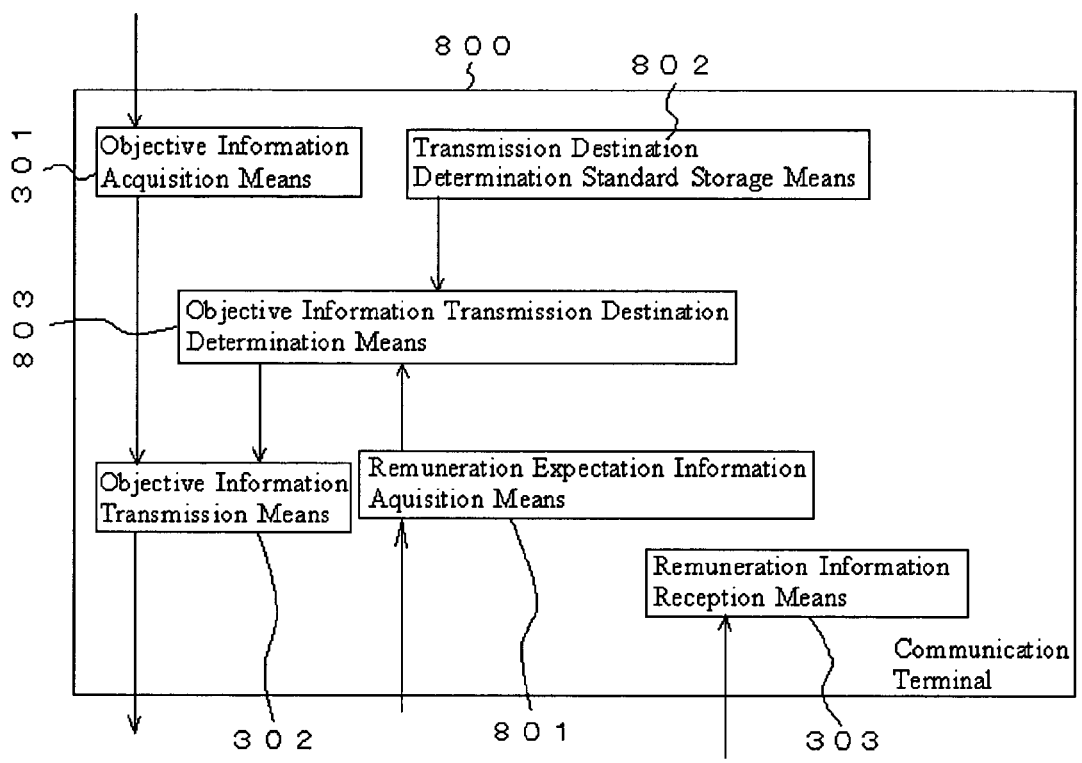
FIG. 8 is a functional block diagram of the communication terminal of the second embodiment of the present invention.

FIG. 8 is a functional block diagram of the communication terminal related to the present embodiment. As it becomes clear by comparing FIG. 8 to FIG. 3, communication terminal 800 of the present embodiment has a configuration wherein communication terminal 300 of the first embodiment comprises remuneration expectation information reception means 801, transmission destination determination standard storage means 802, and objective information transmission destination determination means 803.

Remuneration expectation information reception means 801 receives remuneration expectation information indicating content of remuneration information acquired in return for transmission of objective information.

FIG. 9 is a diagram of remuneration expectation information received in remuneration expectation information reception means 801 in the form of a table. Column 901 stores data indicating the area in which objective information is acquired by latitude and longitude, and column 902 stores the category of objective information, and column 903 stores remuneration expectation information. According to this table, it is indicated that, for example, 10 points are given as remuneration information for temperature data for latitude 32.0 to 32.2 degrees north and longitude 130.0 degrees to 130.2 degrees east.

Transmission destination determination standard storage means 802 stores the transmission destination determination standard for determining the transmission destination of objective information. For example, it stores condition of remuneration expectation information for the transmission of objective information.

FIG. 10 is a diagram of the transmission destination determination standard in the form of a table. Column 1001 stores the category of objective information and column 1002 stores the condition for transmission of objective information. For example, objective information, whose category is temperature, is transmitted when remuneration expectation information exceeds 9 points.

Note that the transmission destination determination standard may be expressed dependent not only on remuneration expectation information, but also on who the administrator is. Moreover, the transmission destination determination standard may be expressed by a program determining the transmission destination based on remuneration expectation information etc.

Objective information transmission destination determination means 803 determines the transmission destination based on the above-described remuneration expectation information and the transmission destination determination standard stored in transmission destination determination standard storage means 802. Above-described remuneration expectation information corresponds to remuneration expectation information received by remuneration expectation information reception means 801.

Hence, objective information transmission destination determination means determines the transmission destination by applying the transmission destination determination standard stored in the transmission destination determination standard storage means to the remuneration expectation information received in the remuneration expectation information reception means. For example, in cases where remuneration expectation information indicated in the form of FIG. 9 is received, and transmission destination determination standard is indicated in the form of FIG. 10, the information provider of objective information indicating temperature of latitude 32.0 to 32.2 degrees north and longitude 130.0 degrees to 130.2 degrees east is determined by transmission destination of remuneration expectation information.

Figure 11:
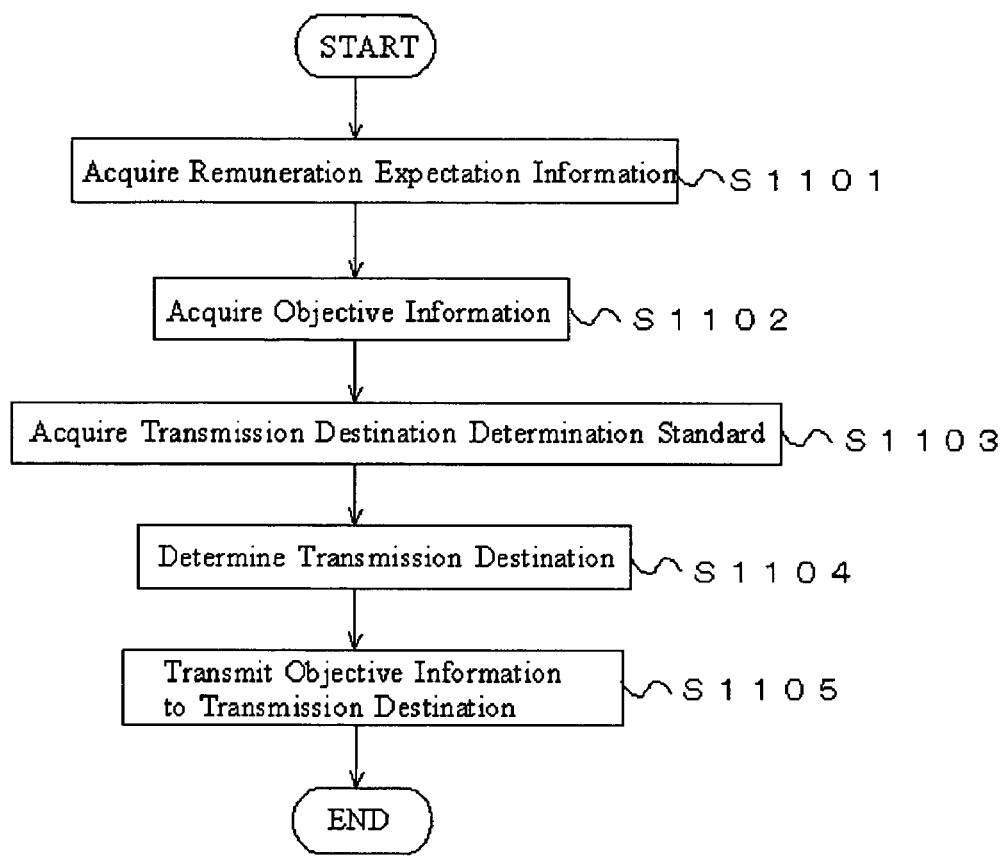
FIG. 11 is a flow chart of the process of the communication terminal of the second embodiment of the present invention.
Figure 1:
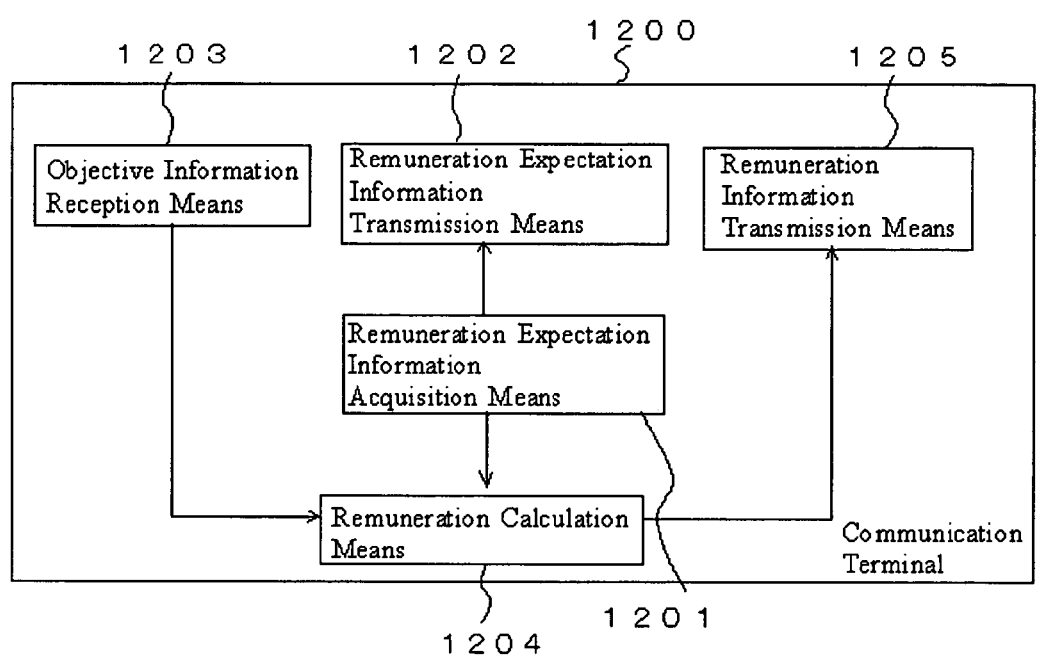

FIG. 11 is a flow chart of the process of the communication terminal of the present embodiment.

In step S1101, remuneration expectation information received in remuneration expectation information reception means 801 is acquired. For example, remuneration expectation information received in remuneration expectation information reception means 801 is acquired at the point of the reception, or at the point of reading remuneration expectation information stored in remuneration expectation information reception means 801.

In step S1102, objective information is acquired by objective information acquisition means 301.

In step S1103, the transmission destination determination standard stored in transmission destination determination standard storage means 802 is acquired by objective information transmission destination determination means 803.

In step S1104, the transmission destination is determined by objective information transmission destination determination means 803.

In step S1105, objective information is transmitted to the transmission destination by objective information transmission means 302.

Communication terminal 800 executes the process of the flow chart of FIG. 11 in cases where, for example, remuneration expectation information is received, or the condition for acquiring objective information is fulfilled.

According to the present embodiment, the process corresponding to the auction of objective information is realized, so that competition among information processing apparatus arises, thereby providing profits for users of communication terminals such as high-rate remuneration for communication terminals.

As the third embodiment of the present invention, the case in which the communication terminal determines whether objective information is to be transmitted to each transmission destination candidate will be described.

A functional block diagram of the communication terminal of the present embodiment is the same as that of the communication terminal of the second embodiment.

However, the following points are different from the communication terminal of the second embodiment. Therefore, remuneration expectation information reception means 801 receives remuneration expectation information in relation to the transmission destination candidate identification information. Here, transmission destination candidate identification information corresponds to information for identifying the transmission destination candidate, which is a candidate of the transmission destination, for example, such as FQDN (Full Qualified Domain Name), IP address, and telephone number etc.

Moreover, in the present embodiment, objective information transmission destination determination means 803 determines the transmission destination with respect to each transmission destination candidate identified by transmission destination candidate identification information.

Figure 15:
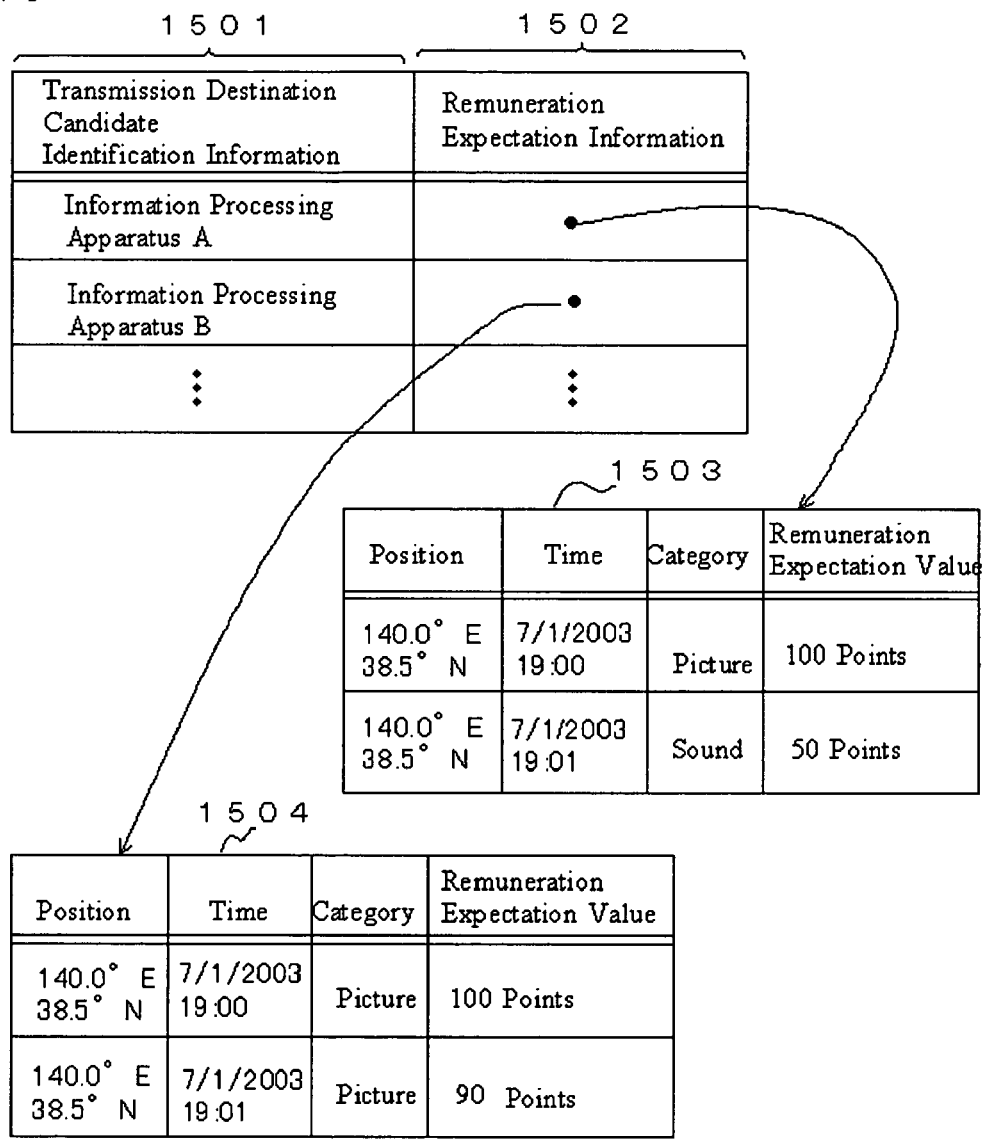
FIG. 15 is a diagram of an example of data configuration for determining the transmission destination by objective information transmission destination determination means in the third embodiment of the present invention.
Figure 1:
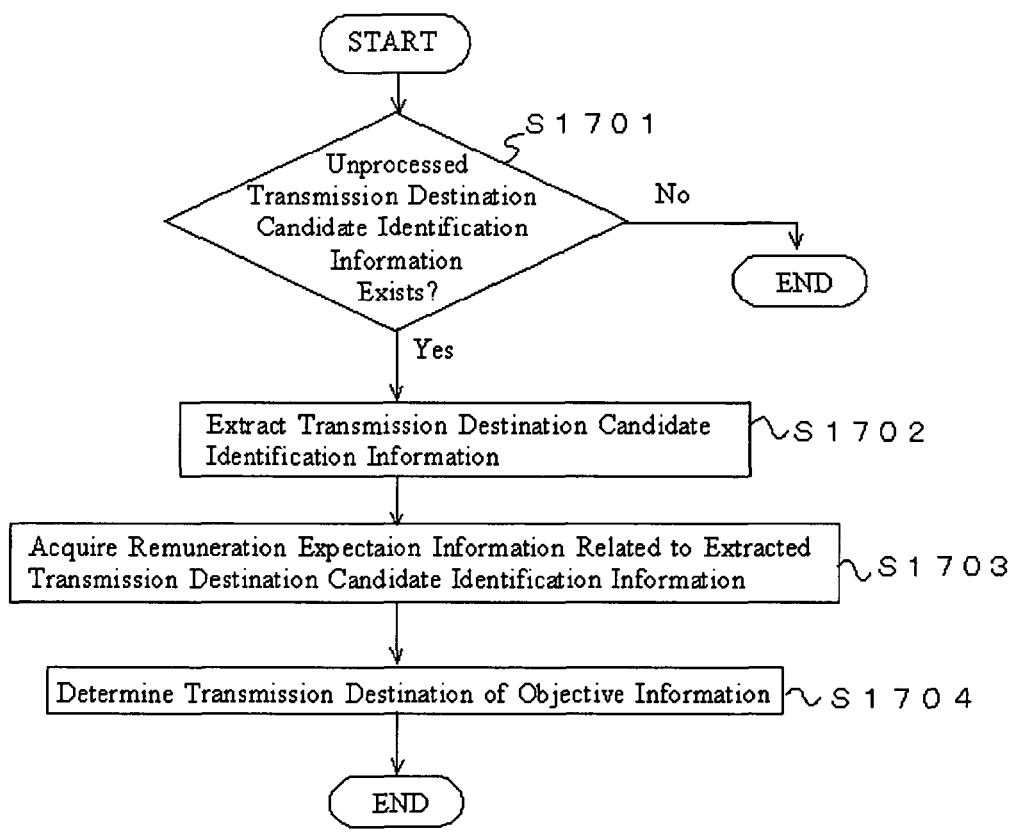
Figure 1:
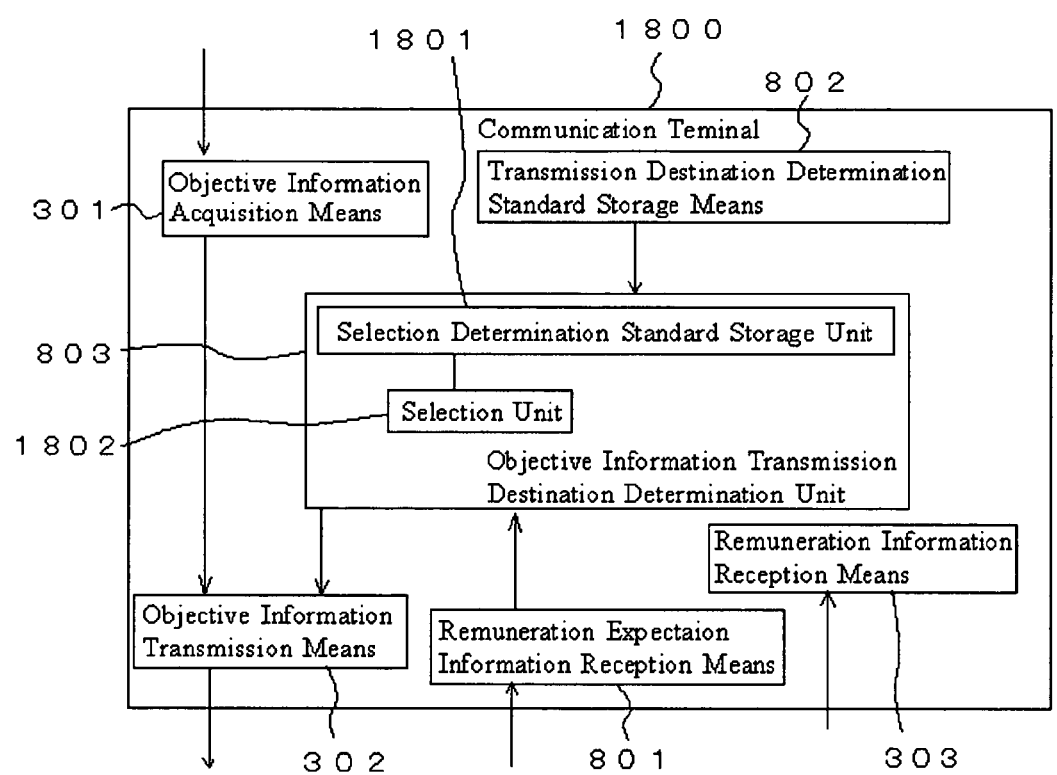

FIG. 15 illustrates the data configuration by which objective information transmission destination determination means 803 determines the transmission destination.

Column 1501 of a table illustrated in FIG. 15 stores the transmission destination candidate identification information, and column 1502 stores a pointer indicating the table storing remuneration expectation information indicated by transmission destination candidate identification information. This pointer indicates correspondence of remuneration expectation information received in remuneration expectation information reception means and transmission destination candidate identification information. In FIG. 15, information processing apparatus A, as transmission destination candidate identification information, is received in relation to remuneration expectation information of table 1503, and information processing apparatus B is received in relation to remuneration expectation information of table 1504.

For example, in cases where objective information is a picture taken at 38.5 degrees north, 140.0 degrees east, Jul. 1, 2003 at 7:00 pm, and transmission destination determination standard determines to transmit objective information when more than 105 points are given as remuneration information, as shown in FIG. 16, it is determined that it does "not transmit" objective information to information processing apparatus A and "transmits" to information processing apparatus B.

FIG. 17 is a flow chart of the process of objective information transmission destination determination means.

In step S1701, it is determined whether there is unprocessed transmission destination candidate identification information. Note that unprocessed transmission destination candidate identification information corresponds to transmission destination candidate identification information which is not processed from step S1702 to step S1704.

If there is unprocessed transmission destination candidate identification information, it will proceed to step S1702, and if not, it will end the process.

In step S1702, transmission destination candidate identification information is extracted.

In step S1703, remuneration expectation information related to extracted transmission destination candidate identification information is acquired. For example, remuneration expectation information is acquired by tracking back to the pointer stored in column 1502 of FIG. 15.

In step S1704, it is determined whether the information processing apparatus indicated by transmission destination candidate identification information, extracted in step S1702, is the transmission destination of objective information based on remuneration expectation information and the transmission destination determination standard acquired in step S1703. Subsequently, it returns to step S1701.

In the present embodiment, since it is determined whether objective information is to be transmitted to each received remuneration expectation information, it can select one which is favorable for the communication terminal user from multiple remuneration expectation information.

As the fourth embodiment of the present invention, the communication terminal selecting a single destination from multiple transmission destinations will be described.

FIG. 18 is a functional block diagram of the communication terminal of the present embodiment. Communication terminal 1800 has a configuration wherein objective information transmission destination determination means 803 of the third embodiment comprises selection determination standard storage unit 1801 and selection unit 1802.

Selection determination standard storage unit 1801 stores a selection determination standard for selecting one transmission destination from multiple transmission destination candidates. An example of the selection determination standard includes, "select the last transmission destination transmitting remuneration expectation information from multiple transmission destinations". By such a selection determination standard, selected transmission destination corresponds to transmission destination presenting the latest remuneration expectation information, thereby ensuring acquisition of remuneration as indicated by remuneration expectation information because remuneration expectation information is typically rarely updated after the communication terminal receives it.

Selection unit 1802 selects the single transmission destination based on the selection determination standard stored in selection determination standard storage means 1801.

Figure 19:
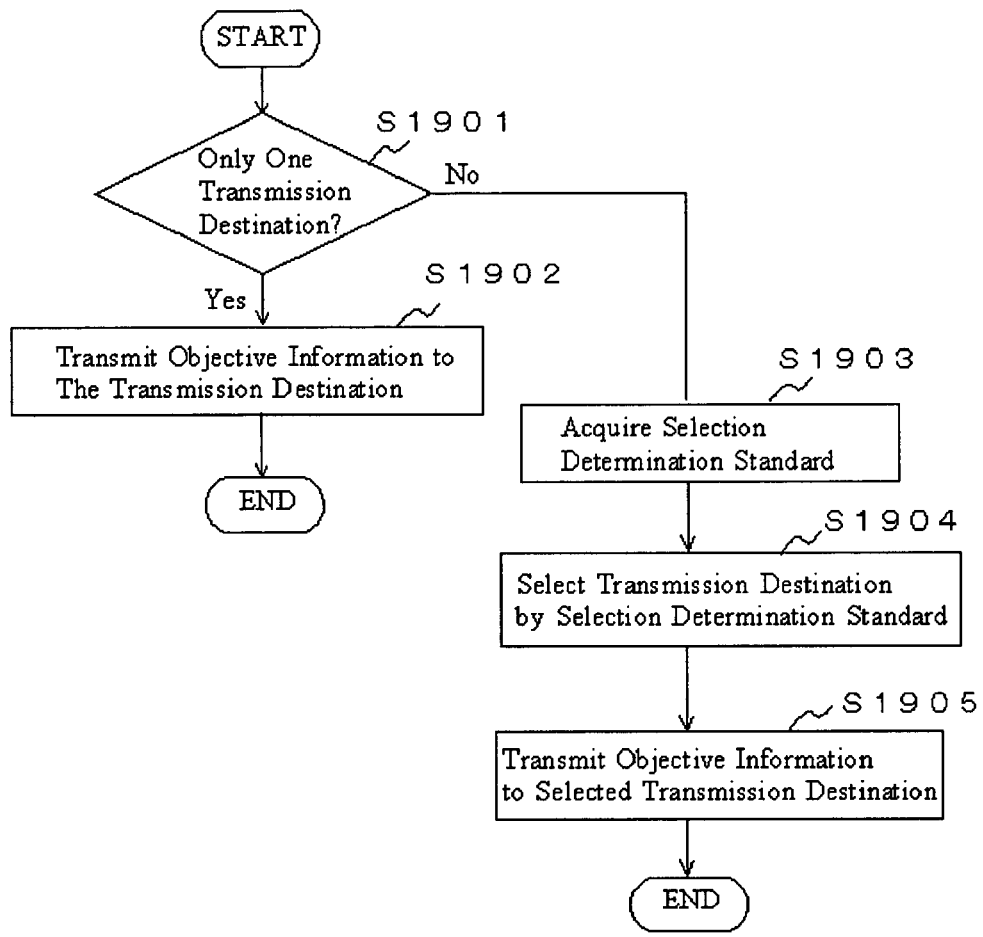
FIG. 19 is a flow chart demonstrating the process of the communication terminal of the fourth embodiment of the present invention.

FIG. 19 is a flow chart of the process of objective information transmission destination determination means 803 and objective information transmission means 302 of communication terminal 1800 of the present embodiment.

Firstly, in step S1901, it is determined whether there is a single transmission destination. If so, it will return to step S1902 and the objective information is transmitted to the single transmission destination.

In step S1901, if there are multiple transmission destinations, it proceeds to step S1903 and the selection determination standard stored in selection determination standard storage unit 1801 is acquired.

Secondly, in step S1904, selection unit 1802 selects the single transmission destination by the transmission destination standard.

Finally, in step S1905, objective information is selected and transmitted to the transmission destination.

According to the present embodiment, since the single transmission destination is selected, the transmission of the same objective information to multiple information processing apparatuses becomes avoidable, thereby making remuneration information scarcer and therefore more valuable, so that the communication terminal user can acquire higher remuneration.

As the fifth embodiment of the present invention, in the communication terminal of the fourth embodiment, when the selection determination standard stored in the selection determination standard storage unit corresponds to the selection determination standard for selecting the transmission destination presenting the highest remuneration indicated in the remuneration expectation information as the single transmission destination, will be described.

Hence, in the present embodiment, the selection determination standard storage unit stores the standard for selecting the information processing apparatus presenting the highest remuneration indicated in the remuneration expectation information, and the selection unit selects the information processing apparatus presenting the highest remuneration according to such a standard. When remuneration is expressed by a numerical value such as points and amount of money, remuneration values are compared numerically.

When remunerations are programs, remuneration values are compared by comparing functions implemented on the programs using numeral values.

For example, functions implemented on a program are expressed in numerical values by the length of time in which a program operates effectively and the data capacity etc., thereby making it possible to compare remuneration values numerically.

Moreover, in cases where since all remuneration values are at the same level, the multiple transmission destinations cannot be selected to a single transmission destination by the selection determination standard, for example, a single transmission destination is selected at random. Moreover, multiple transmission destinations may be selected and objective information may be transmitted to them.

According to the present embodiment, objective information is transmitted to the transmission destination expected to present the highest remuneration, thereby maximizing remuneration to be acquired.

As the sixth embodiment of the present invention, the information processing apparatus will be described. This information processing apparatus corresponds to the information processing apparatus of the third embodiment.

FIG. 12 is a functional block diagram of information processing apparatus related to the present embodiment. Information processing apparatus 1200 comprises remuneration expectation information acquisition means 1201, remuneration expectation information transmission means 1202, objective information reception means 1203, remuneration calculation means 1204, and remuneration information transmission means 1205.

Remuneration expectation information acquisition means 1201 acquires remuneration expectation information indicating the content of remuneration for objective information. For example, remuneration expectation information stored in a storage device such as a hard disk etc. is acquired. Additionally, remuneration expectation information input from a keyboard etc. connected to information processing apparatus is acquired.

Note that remuneration expectation information acquired by remuneration expectation information acquisition means 1201 may be information indicating the content of remuneration information in relation to an objective information attribute value. Here, objective information attribute value corresponds to attribution of objective information. Examples of attribution of objective information include category of objective information, position information, for example latitude and longitude or place name, at which objective information is acquired.

Moreover, examples of objective information attribute values include a value indicating that objective information relates to an accident, a value indicating that objective information relates to weather, a value indicating that objective information relates to a disaster, a value indicating that objective information relates to a traffic jam, and a value indicating that objective information relates to an economic data etc.

"Objective information is accident information" means that objective information corresponds to information related to an accident. Examples of objective information include information of a picture of an accident scene, audio information at an accident scene, and information of onlookers at an accident scene etc.

"Objective information relates to weather" means that objective information corresponds to information related to weather. Examples of objective information include temperature, humidity, barometric pressure, and rainfall level. Moreover, not only information about weather itself, but also information indicating other phenomenon caused by weather is included. For example, information indicating whether umbrellas are used, whether car wipers are being operated, and whether a fog lamp is lit because of the fog, may be included.

"Objective information is information about a disaster" means that objective information corresponds to information related to a disaster. Examples of objective information may include water depth of a flood, noise level of a snow avalanche, and pictures of a mud slide.

"Objective information is information about a traffic jam" means that objective information corresponds to information related to a traffic jam. Examples of objective information include pictures showing the degree of congestion on a road, length of time of moving at the speed of less than a predetermined speed such as 15 kph or completely stopped, length of the traffic jam, and required time for traveling from one specific place to another.

"Objective information is information about an economy" means that objective information relates to the economy. Examples of objective information include stock price and performance of specific company, average stock prices in the stock market, exchange rates, and long-term or short-term interest rates etc.

Moreover, one or more combinations described above may be adopted as the objective information attribute value.

Remuneration expectation information transmission means 1202 transmits remuneration expectation information acquired in remuneration expectation information acquisition means 1202 in relation to identification information identifying itself. For example, remuneration expectation information indicated in the table illustrated in FIG. 9 is transmitted in relation to identification information of information processing apparatus 1200. Examples of identification information include FQDN of the information processing apparatus, IP address, telephone number etc.

Objective information reception means 1203 receives objective information. Received objective information may be related to attribute information the indicating category of objective information and the sequence in which objective information is acquired.

Remuneration calculation means 1204 calculates remuneration for the above-described objective information. Above-described objective information corresponds to objective information received by objective information reception means 1203. Remuneration calculation means 1204 calculates remuneration information by applying remuneration expectation information acquired in remuneration expectation information acquisition means 1201 to objective information. Moreover, remuneration information may be calculated based on evaluation value input based on objective information displayed on the information processing apparatus.

Remuneration information transmission means 1205 transmits remuneration information related to remuneration calculated by remuneration calculation means 1204.

Figure 13:
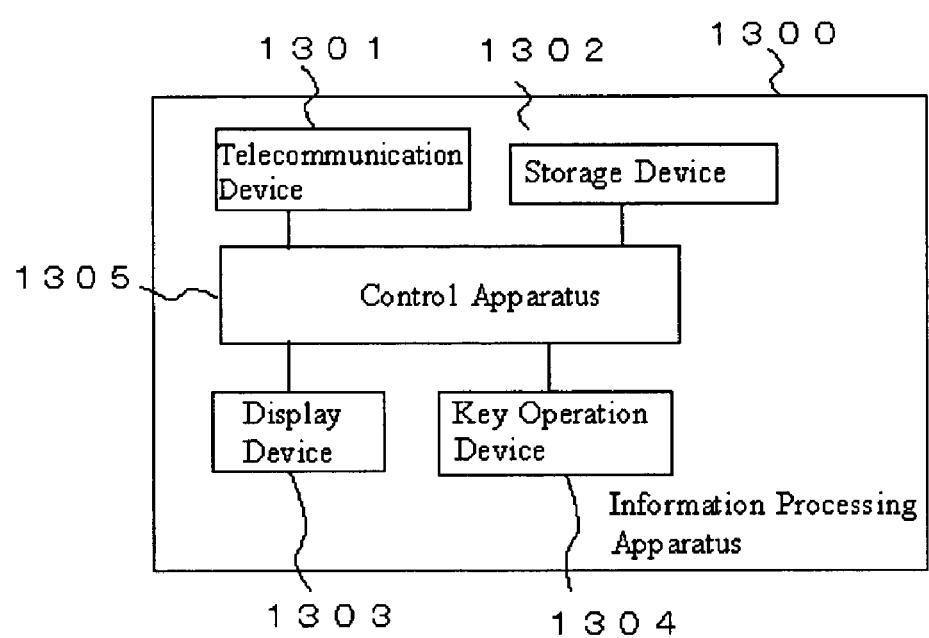
FIG. 13 is a diagram of an example of hardware configuration of the information processing apparatus.

FIG. 13 is an example of hardware configuration of the information processing apparatus. Information processing apparatus 1300 is configured wherein telecommunication device 1301, storage device 1302, display device 1303, and key operation device 1304 are connected to control apparatus 1305.

Telecommunication device 1301 is used to transmit remuneration expectation information, to receive objective information, and to receive remuneration information. Storage device 1302 is used to store remuneration expectation information and receive objective information. Display device 1303, and key operation device 1304 are used to display objective information and to input evaluation value of objective information etc.

Control apparatus 1305 is implemented by operating programs controlling telecommunication device 1301, storage device 1302, display device 1303, and key operation device 1304.

Figure 14:
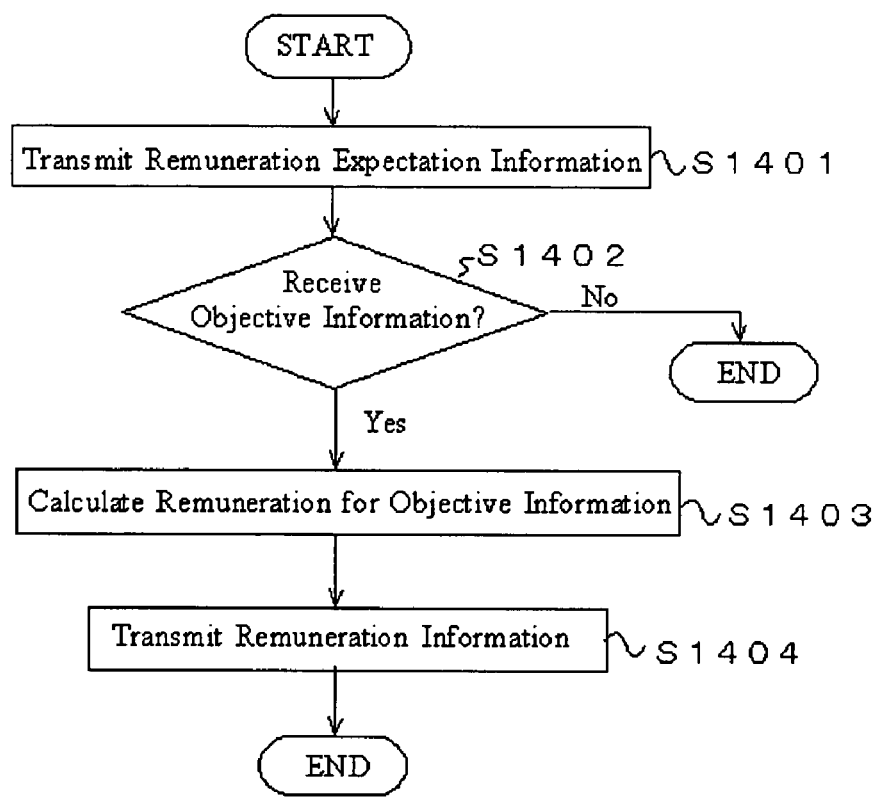
FIG. 14 is a flow chart of the process of the information processing apparatus of the sixth embodiment of the present invention.

FIG. 14 is a flow chart of the process of the information processing apparatus related to the present embodiment.

In step S1401, remuneration expectation information is transmitted by remuneration expectation information transmission means 1202.

In step S1402, it is determined whether objective information is received by objective information reception means 1203. For example, it is determined whether objective information is received within a predetermined time. If so, it will proceed to step S1403. If not, it will end the process.

In step S1403, remuneration for objective information is calculated in remuneration calculation means 1204.

In step S1404, remuneration information is transmitted by remuneration information transmission means 1205.

Information processing apparatus executes the process of FIG. 14 at every passage of a predetermined time or at every inputting or updating of remuneration expectation information.

Note that, in FIG. 14, although the process for receiving objective information with respect to each transmission of remuneration expectation information is described, the process for transmitting remuneration expectation information and the process for receiving objective information and transmitting remuneration information may be executed independently by other processes, tasks and threads.

Moreover, in step S1402, in cases where objective information cannot be received, it may be displayed that objective information cannot be received. Furthermore, in cases where remuneration expectation information is stored, remuneration expectation information may be changed. For example, it may be changed so that remuneration expectation information is set to a high rate.

According to the present embodiment, since remuneration expectation information is transmitted to the communication terminal for receiving objective information, competition among information processing apparatus arise, thereby bringing remuneration to a high rate thereby increasing the communication terminal user's profit.

According to the present invention, as described hereinbefore, it becomes possible to provide objective information from the communication terminal without the user's knowledge. Moreover, objective information is transmitted to the information processing apparatus presenting the highest remuneration value according to remuneration expectation information presented by multiple information processing apparatuses, thereby making the communication terminal user more profitable.

What is claimed is:

1. A communication terminal comprising:
   an objective information acquisition means acquiring objective information indicating objective information, wherein said objective information includes one or more combinations selected from a group of values comprising information about an accident, information on weather, information on a disaster, information on a traffic jam, and information on a location from which said objective information is acquired, said objective information acquisition means includes a sensor or CCD camera attached or secured in said communication terminal,
   an objective information transmission means transmitting said objective information,
   a remuneration information reception means receiving remuneration information related to remuneration for said transmitted objective information.

2. A communication terminal comprising;
   an objective information acquisition means acquiring objective information indicating objective information,
   an objective information transmission means transmitting said objective information, a remuneration information reception means receiving remuneration information related to remuneration for said transmitted objective information, a remuneration expectation information reception means receiving remuneration expectation information indicating the content of remuneration acquired in return for transmission of objective information, a transmission destination determination standard storage means storing transmission destination determination standards for determining the transmission destination to which objective information is to be transmitted, and an objective information transmission destination determination means determining the transmission destination based on said remuneration expectation information and the transmission destination determination standard stored in the transmission destination determination standard storage means.

3. The communication terminal of claim 2 wherein;

a remuneration expectation information reception means receives remuneration expectation information in relation to the transmission destination candidate identification information identifying the transmission destination candidate, candidate for transmission, and an objective information transmission destination determination means determining the transmission destination with respect to each transmission destination candidate identified by transmission destination candidate identification information.

4. The communication terminal of claim 3 wherein said objective information transmission destination determination means comprises:

a selection determination standard storage unit storing the selection determination standard that selects only one transmission destination from multiple transmission destination candidates, and a selecting unit selecting only one transmission destination based on the selection determination standard stored in the selection determination standard storage unit.

5. The communication terminal of claim 4 wherein the selection determination standard stored in the selection determination standard storage unit corresponding to the standard for selecting only one transmission destination candidate presenting the highest remuneration indicated in said remuneration expectation information.

6. An information processing apparatus comprising:

a remuneration expectation information acquisition means acquiring remuneration expectation information indicating the content of remuneration for objective information, a remuneration expectation information transmission means transmitting remuneration expectation information acquired in remuneration expectation information acquisition means in relation to identification information identifying itself, an objective information reception means receiving objective information, a remuneration calculation means calculating remuneration for said objective information, and a remuneration information transmission means transmitting remuneration information related to remuneration calculated by said remuneration calculation means.

7. The information processing apparatus of claim 6 wherein remuneration expectation information acquired in said remuneration expectation information acquisition means corresponds to information indicating the content of remuneration in relation to the objective information attribute value indicating the attribute value of objective information.

8. The information processing apparatus of claim 7 comprising said objective information attribute value wherein objective information includes one or more combinations selected from a group of values comprising information about an accident, information on weather, information on a disaster, information on a traffic jam, information on an economy, and information on a location from which objective information was acquired.

* * * * *